US012474304B2

(12) United States Patent
Liu et al.

(10) Patent No.: US 12,474,304 B2
(45) Date of Patent: Nov. 18, 2025

(54) SEEPAGE AND ACOUSTIC WAVE COUPLING SYSTEM FOR ROCK TENSILE TESTING

(71) Applicants: Research Institute of Petroleum Exploration & Development, PetroChina Company Limited, Beijing (CN); Sichuan University, Sichuan (CN)

(72) Inventors: Jianfeng Liu, Sichuan (CN); Mancang Liu, Sichuan (CN); Xiaosong Qiu, Sichuan (CN); Lu Wang, Sichuan (CN); Jinbing Wei, Sichuan (CN); Jianliang Pei, Sichuan (CN); Huining Xu, Sichuan (CN); Zhide Wu, Sichuan (CN); Yunhe Su, Sichuan (CN); Shujuan Xu, Sichuan (CN); Xin Lai, Sichuan (CN); Jianxiong Yang, Sichuan (CN)

(73) Assignees: Sichuan University, Sichuan (CN); Research Institute of Petroleum Exploration & Development, PetroChina Company Limited, Beijing (CN)

( * ) Notice: Subject to any disclaimer, the term of this patent is extended or adjusted under 35 U.S.C. 154(b) by 278 days.

(21) Appl. No.: 18/455,957

(22) Filed: Aug. 25, 2023

(65) Prior Publication Data
US 2024/0068991 A1    Feb. 29, 2024

(30) Foreign Application Priority Data
Aug. 30, 2022  (CN) .......................... 202211045016.5

(51) Int. Cl.
*G01N 29/14*   (2006.01)
*G01N 3/04*    (2006.01)
(Continued)

(52) U.S. Cl.
CPC .............. *G01N 29/14* (2013.01); *G01N 3/04* (2013.01); *G01N 29/28* (2013.01); *G01N 3/08* (2013.01);
(Continued)

(58) Field of Classification Search
CPC .......... G10N 29/14; G10N 29/28; G01N 3/04; G01N 3/08; G01N 2203/0017;
(Continued)

(56) References Cited

FOREIGN PATENT DOCUMENTS

| CN | 103308388 A | 9/2013 |
|---|---|---|
| CN | 206248434 U | 6/2017 |

(Continued)

*Primary Examiner* — Jonathan M Dunlap
(74) *Attorney, Agent, or Firm* — NKL Law; Allen Xue

(57) ABSTRACT

A clamping triaxial seepage and acoustic coupling rock tensile testing machine includes a sample and a scaffold-type tensile testing device. The scaffold-type tensile testing device has an upper chuck and a lower chuck. The upper chuck has an acoustic transmitting channel, one end of which communicating with the outside, and the other end of which having an acoustic transmitting probe. The lower chuck has an acoustic receiving channel, one end of which communicating with the outside, and the other end having acoustic receiving probe. An upper end face of the sample has with a seepage outflow hole while the upper chuck has a seepage outflow channel connected with the seepage outflow hole. A lower end face of the sample has a seepage inflow hole while the lower chuck has a seepage entry channel is connected with the seepage inflow hole.

10 Claims, 9 Drawing Sheets

(51) Int. Cl.
*G01N 29/28* (2006.01)
*G01N 3/08* (2006.01)

(52) U.S. Cl.
CPC ............... *G01N 2203/0017* (2013.01); *G01N 2203/0658* (2013.01)

(58) Field of Classification Search
CPC ... G01N 2203/0658; G01N 2203/0242; G01N 2203/023; G01N 33/24
See application file for complete search history.

(56) References Cited

FOREIGN PATENT DOCUMENTS

| | | | | |
|---|---|---|---|---|
| CN | 108519317 A | 9/2018 | | |
| CN | 109283047 A | 1/2019 | | |
| CN | 113295518 A | 8/2021 | | |
| CN | 115406762 A | * 11/2022 | ............... | G01N 3/02 |
| CN | 115406763 A | * 11/2022 | ............... | G01N 3/02 |
| CN | 115524227 A | * 12/2022 | ............... | G01N 3/10 |

\* cited by examiner

SEEPAGE AND ACOUSTIC WAVE COUPLING SYSTEM FOR ROCK TENSILE TESTING

FIELD OF THE INVENTION

The present invention belongs to the technical field of rock tensile test, and in particular relates to a clamping triaxial seepage and acoustic coupling rock tensile testing machine and a test method thereof.

DESCRIPTION OF THE RELATED ART

Testing of three kinds of mechanical parameters of rock, such as crush resistance, tensile strength and shear strength, is indispensable in all rock engineering constructions. A tensile test of rock samples is an important means to understand tensile load bearing capacity of rock. As one of basic mechanical parameters in engineering constructions, a tensile strength value of rock is very important for engineering design calculation. At present, there are two main methods used to determine the tensile strength value of rock: an indirect tensile method and a direct tensile method.

The indirect tensile method is also known as a Brazilian splitting method. Because of its simple operation and wide universality, it can be implemented on all conventional material compression mechanics testing machines, and it is also the only recommended test method in a national standard "Engineering Rock Mass test Method Standard". Although the Brazilian splitting method is a widely recommended test method in ISRM and "Engineering Rock Mass test Method Standard", specific test methods are different and can be divided into direct loading methods, pad strip methods and arc loading methods.

The recommended method in the "Engineering Rock Mass test Method Standard" is to add a metal pad strip between a specimen and an indenter, and is to add a cork pad between the specimen and the indenter for soft rock. Although it is to ensure that the indenter transfers a linear concentrated load to an end of the specimen, it still does not solve the problem of brittle rock ends being brittle, and a research shows that the tensile strength of the rock obtained by this method is small.

In the ISRM, it is recommended to set a contact point between the indenter and the specimen as an arc. Although this method ensures that the end of the specimen is an arc compression zone and reduces a risk of breakage of the end of the specimen to a certain extent, this method requires an arc of the indenter to match a sample size, which not only has low universality, but also leads to a high tensile strength. Although this method is simple to operate and can be carried out on all material compression mechanics testing machines, it still has the following shortcomings on the whole: (1) Due to influence of an end loading zone, the accuracy of the measured tensile strength is still an unavoidable problem; (2) During a splitting process, it is difficult to ensure that the splitting surface must follow a predetermined loading surface; (3) There is no guarantee that a fracture surface must be a failure surface with the smallest bearing capacity, especially for rocks with obvious bedding and defects. Therefore, the tensile strength value measured by the indirect measurement can not fully reflect a real situation.

In order to solve the problem that results of the indirect tensile test can not fully reflect the real situation, the direct tensile method is used to test tensile mechanics properties of the rocks. However, the direct tensile method has higher requirements on a tensile function of a testing device, resulting in a failure to use an ordinary compression mechanics testing machine for test and low applicability. In order to test the tensile mechanics properties of rocks under different conditions, the applicant combines a direct tensile function of the most advanced MTS815 rock mechanics test system in the world to solve part problems existing in the test, and has obtained a number of patents such as ZL200610022224.8, U.S. Pat. No. 7,624,647B2, ZL201510068200.5, ZL201510068186.9, U.S. Pat. No. 9,488,560B2 and U.S. Pat. No. 9,488,559B2. However, for the direct tensile test of rock mechanics properties, there are still the following shortcomings: (1) Performance requirements for a mechanics test apparatus are high, and the test is carried out in a conventional material testing machine, so the universality of promotion is low; (2) An MTS815 testing machine is utilized for the direct tensile test, and in the test process, disassembly and assembly of loading parts are very tedious and need cooperation of more than one person to complete, so the whole process is time-consuming and laborious; (3) The loading parts to be disassembled and assembled are all steel modules, which are large in volume and heavy in weight, and the disassembly process may cause serious safety hazards such as an apparatus damage or personnel injury; (4) The installation and test process of the direct tensile is complicated, which requires at least 2 persons to cooperate and still requires a lot of labor; (5) In the test, due to the need to use a plurality of loading pad blocks for piling and 2 long loading chains are respectively connected with 2 tensile ends of the rock, an eccentric tensile force is easy to appear which affects the test results; (6) In the field of test the direct tensile mechanics properties of rocks, it is currently neither possible to carry out acoustic detection in the direct tensile test of rocks, nor to carry out the direct tensile test of rocks under the action of the seepage, and there is no direct tensile testing device for rocks simultaneously under the acoustic detection and the action of seepage; and (7) The sample is bonded to the clamping head by an adhesive. After bonding, the adhesive takes a certain time to solidify and cannot be tested immediately, which affects the test efficiency.

BRIEF DESCRIPTION OF THE INVENTION

The present invention aims to provide a clamping triaxial seepage and acoustic coupling rock tensile testing machine and a test method thereof. A sample can be tested immediately after being clamped and the efficiency can be improved. It ensures that the failure occurs along a part with the lowest bearing force of the sample, ensures the measurement accuracy and reduces the test cost, and can be used to carry out rock direct tensile and acoustic detection test simultaneously under triaxial seepage action.

The purpose of the present invention is realized as follows: a clamping triaxial seepage and acoustic coupling rock tensile testing machine, wherein the machine comprises a sample and a scaffold-type tensile testing device; the scaffold-type tensile testing device is provided with an upper chuck and a lower chuck; the upper chuck and the lower chuck both comprise a connecting column and a plurality of clamping teeth; one end of each connecting column is installed on the scaffold-type tensile testing device; the clamping teeth are hinged with the other end of the connecting column; the plurality of clamping teeth are enclosed into a clamping cavity; an outer wall of each clamping tooth is in a circular arc shape and is provided with an external thread; the outer wall of each clamping tooth is provided with a screwing ring matching with the external thread; and a diameter of the outer wall of each clamping tooth gradually decreases in a direction toward the connecting column;

the upper chuck is provided with an acoustic transmitting channel; one end of the acoustic transmitting channel is communicated with the outside; the other end is provided with an acoustic transmitting probe; and a transmitting direction of the acoustic transmitting probe is downward;

the lower chuck is provided with an acoustic receiving channel; one end of the acoustic receiving channel is communicated with the outside; the other end is provided with an acoustic receiving probe; the acoustic receiving probe receives an acoustic wave transmitted by the acoustic transmitting probe;

the clamping teeth of the upper chuck clamp an upper end of the sample; the clamping teeth of the lower chuck clamp a lower end of the sample; an upper end face of the sample is provided with a seepage outflow hole; the upper chuck is provided with a seepage outflow channel; one end of the seepage outflow channel is connected with the seepage outflow hole, and the other end is communicated with the outside; a lower end face of the sample is provided with a seepage inflow hole; the lower chuck is provided with a seepage entry channel; and one end of the seepage entry channel is connected with the seepage inflow hole, and the other end is communicated with the outside.

Further, a spacing between two adjacent clamping teeth is filled with a rubber block; an outer wall of one end of the connecting column connected with the clamping teeth is provided with a sealing sleeve; and an inner wall and an outer wall of the sealing sleeve are both provided with a sealing ring.

Further, the machine further comprises a first screwing turntable and a second screwing turntable, an inner wall of the first screwing turntable is provided with a plurality of bosses, an outer wall of the screwing ring is provided with a plurality of clamping slots, the first screwing turntable is sleeved outside the screwing ring, and each of the bosses is stuck into a clamping slot; an inner wall of the second screwing turntable is provided with a plurality of positioning slots, an outer wall of the connecting column is provided with a plurality of transmission bulges, the second screwing turntable is sleeved outside the clamping teeth, and each of the transmission bulges is stuck into a positioning slot.

Further, the first screwing turntable and the second screwing turntable are both provided with a screwing handle.

Further, the seepage entry channel and the seepage outflow channel are both communicated with the outside through a seepage joint.

Further, the acoustic transmitting channel and the acoustic receiving channel are vertically arranged blind holes, the acoustic transmitting probe and the acoustic receiving probe are located at bottoms of the blind holes, the openings of the blind holes are provided with threaded caps, and the threaded caps are provided with springs inside.

Further, the seepage outflow channel is connected with the seepage outflow hole through an upper spile, the seepage entry channel is connected with the seepage inflow hole through a lower spile, and outer walls of the upper spile and the lower spile are both provided with a sealing ring.

Further, a top plate is fixed on a top of the scaffold-type tensile testing device, a bearing plate is provided above the top plate, the bearing plate is provided with a plurality of vertical force transferring rods, the force transferring rods vertically penetrate through the top plate and sliding fit with the top plate, lower ends of the force transferring rods are provided with a tensile base, the lower chuck is installed on a top of the tensile base, and an upper chuck is installed on a bottom of the top plate.

Further, the tensile base is provided with a lower ball head sliding fitted with the tensile base, and the lower chuck is installed on the lower ball head; and the top plate is provided with an upper ball head sliding fitted with the top plate, and the upper chuck is installed on the upper ball head.

In a test method of the clamping triaxial seepage and acoustic coupling rock tensile testing machine, the upper end of the sample is extended among the plurality of clamping teeth of the upper chuck, the lower end of the sample is extended among the plurality of clamping teeth of the lower chuck, and a rubber block is filled to a spacing between two adjacent clamping teeth, and then the screwing ring is rotated, and the screwing ring drives the plurality of clamping teeth to rotate inward to clamp both ends of the sample and then the sealing sleeve is installed; then, an oil pressure protection heat shrink film is fixed on the outer walls of the sample, the clamping teeth and the sealing sleeve, and then the whole scaffold-type tensile testing device is placed in a pressure chamber, the seepage outflow channel is connected with a seepage outflow tube, the seepage entry channel is connected with a seepage inflow tube, and a seepage medium with a certain pressure is passed through the seepage inflow tube to produce seepage; the acoustic transmitting probe is connected to an acoustic transmitting wire, an acoustic receiving probe is connected to an acoustic receiving wire, the acoustic transmitting wire and the acoustic receiving wire are connected to an external acoustic control system, and an acoustic detection is carried out on the sample; the pressure chamber is filled with oil to apply a triaxial lateral compression stress, a compression load is applied to the bearing plate through an indenter of the testing machine, the compression load is transmitted through the force transferring rods to the tensile base, and the tensile base forms a tensile load on the sample, wherein the tensile load is equal to a compression load applied by a material compression mechanics testing machine; and when the sample is destroyed, the oil in the pressure chamber is pumped back, and the seepage outflow tube, the seepage inflow tube, the acoustic transmitting wire and the acoustic receiving wire are removed.

The present invention has the following advantages: 1. The present invention can carry out the rock tensile test only by using a conventional material testing machine, without adding a separate tensile test apparatus, and has wide universality, which overcomes the defect of high cost of the traditional direct tensile method apparatus.

2. The present invention adopts the direct tensile method of compression, rotary and drawing, which can ensure the failure along the part with the lowest bearing force of the sample, and overcome the defect of low accuracy of the traditional indirect tensile method.

3. The structure of the device is simple, which is mainly consisted of a steel structure; compared with a similar tensile test apparatus, the cost is low; it has a small size and a light weight, so it is easy to be moved; the operation is convenient and labor-saving, and one person can carry out the test, which reduces the use cost; it avoids accidents such as an accidental damage to the equipment and personal safety of an operator due to disassembly of heavy loading parts, which has high safety; and the tensile structure is compact, which avoids an eccentric bearing force problem that may exist in the superposition of a plurality of parts.

4. Because the present invention has a compact structure and a small volume, it can be placed in the pressure chamber of the existing triaxial testing machine, solving the problem that the rock direct tensile test cannot be carried out under the triaxial lateral stress; and the problem that the rock direct tensile test cannot be carried out simultaneously under the acoustic detection and the action of the seepage is solved by providing acoustic components and seepage components at the positions of the upper and lower chucks.

5. The present invention adopts the upper chuck and the lower chuck to clamp both ends of the sample, after which the test can be carried out immediately without waiting, and the test efficiency can be improved.

DETAILED DESCRIPTION OF EMBODIMENTS OF THE INVENTION

Figure 1:
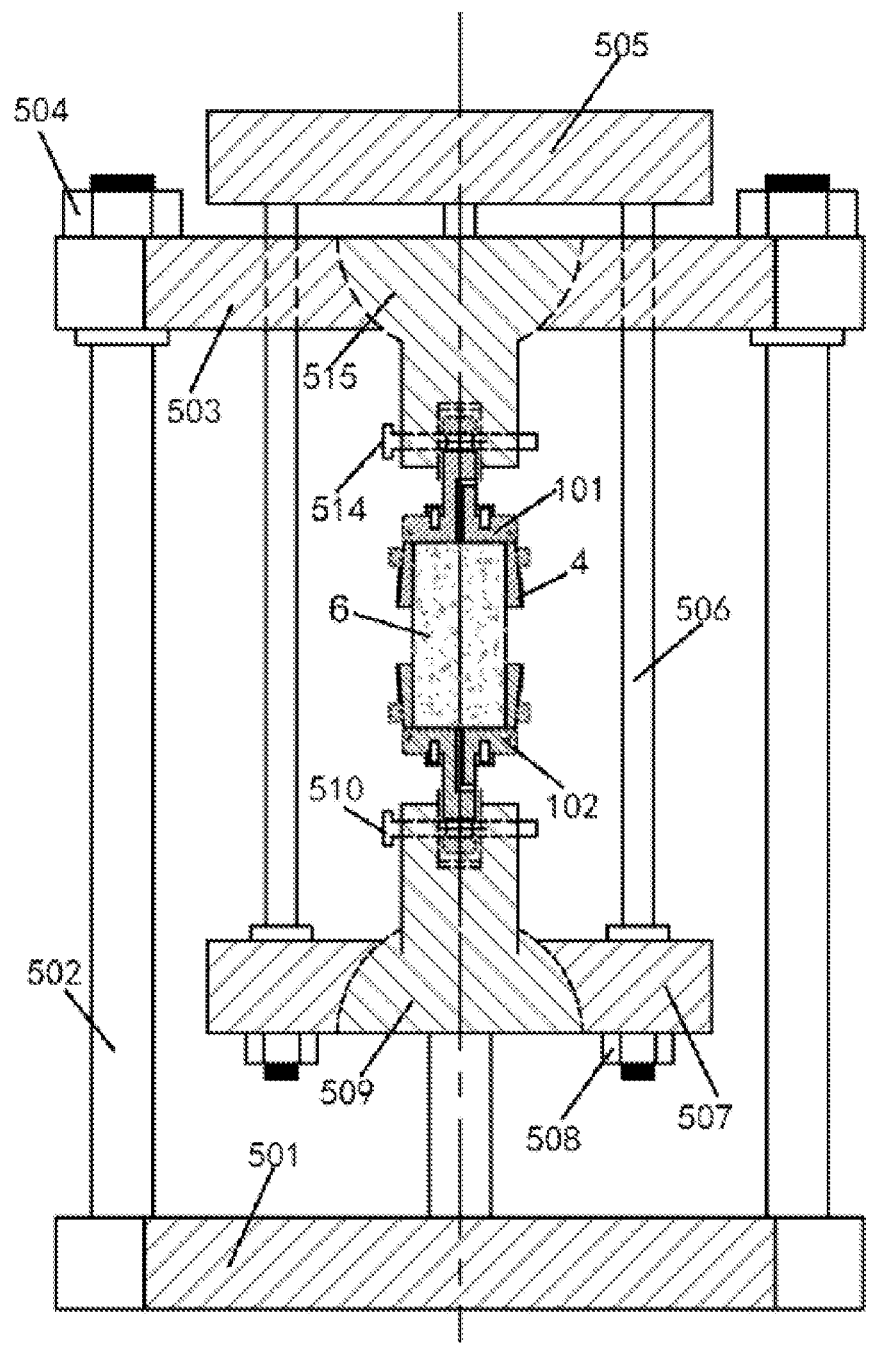
FIG. 1 is a schematic diagram of a clamping triaxial seepage and acoustic coupling rock tensile testing machine in the present invention.
Figure 2:
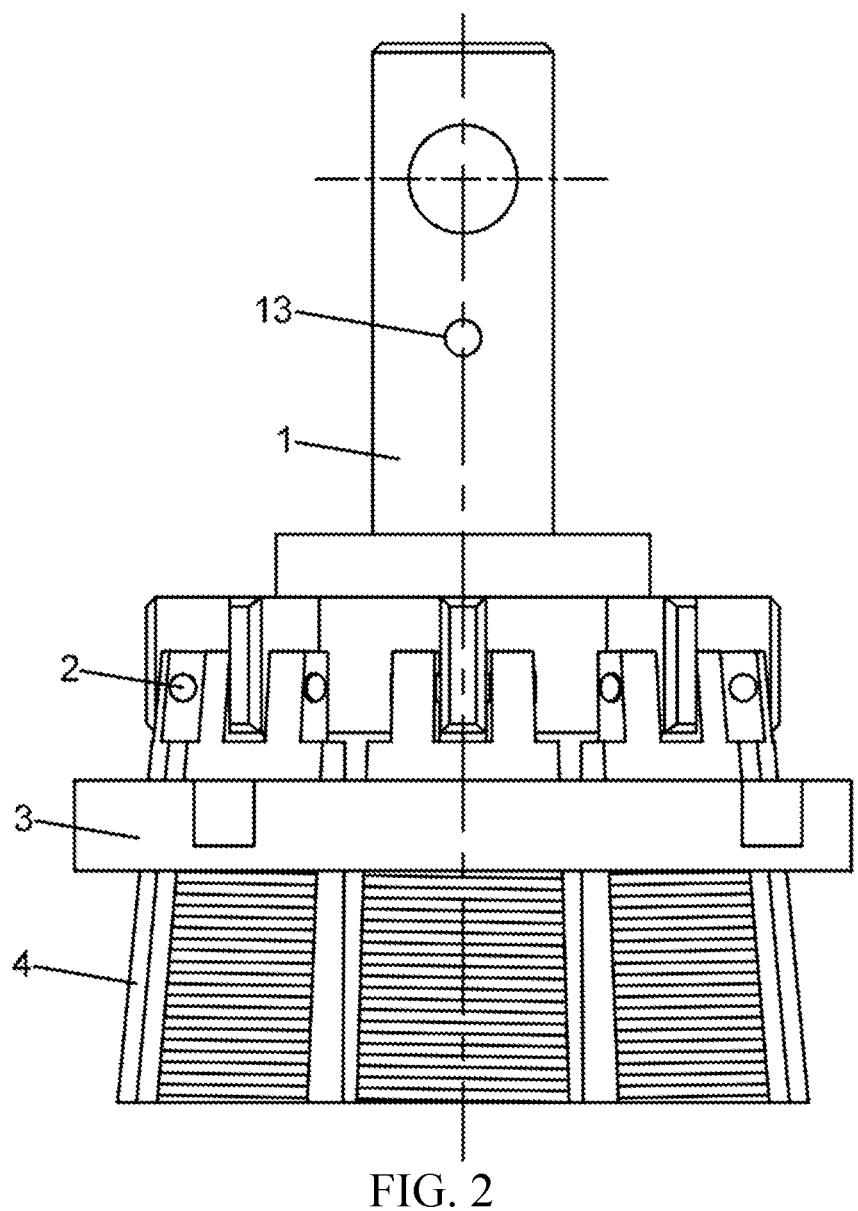
FIG. 2 is a front view of an upper chuck.
Figure 3:
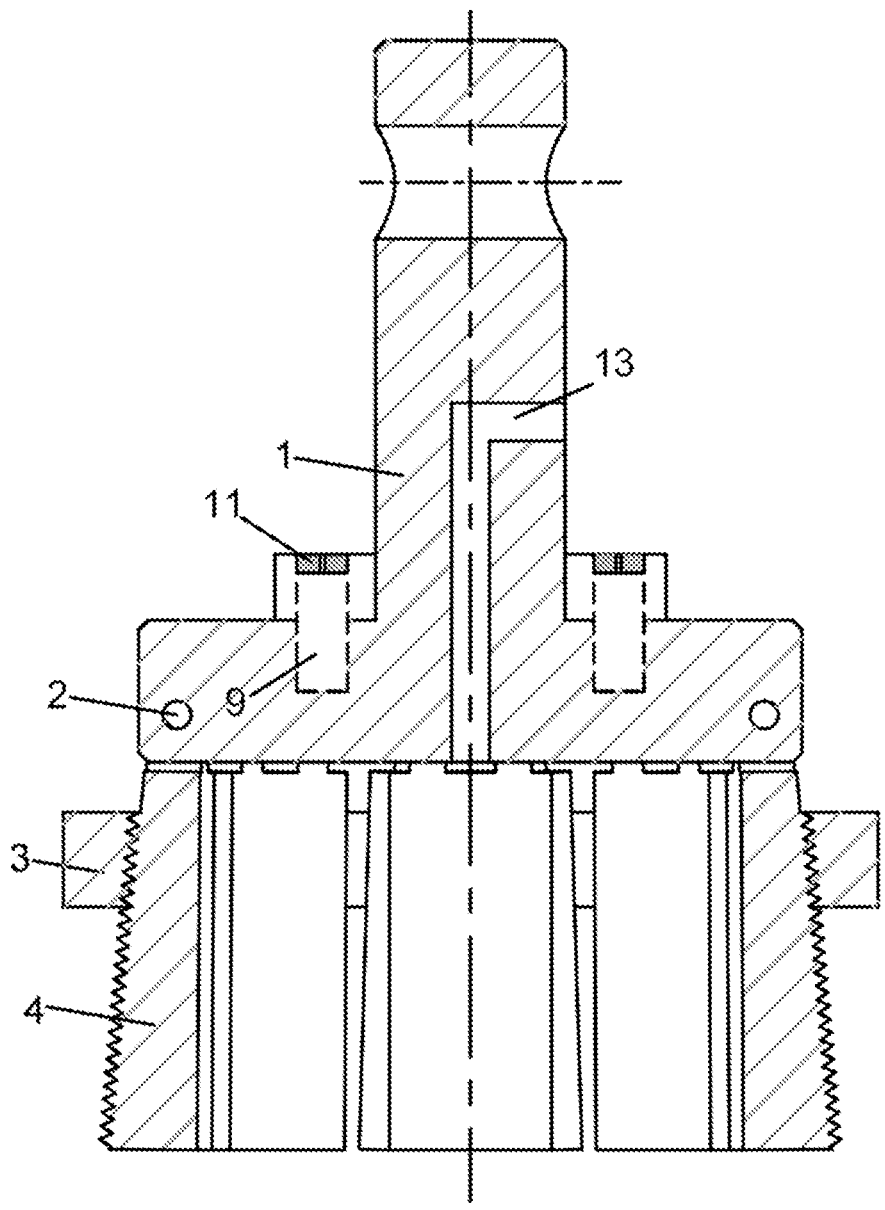
FIG. 3 is a front sectional schematic diagram of the upper chuck.
Figure 4:
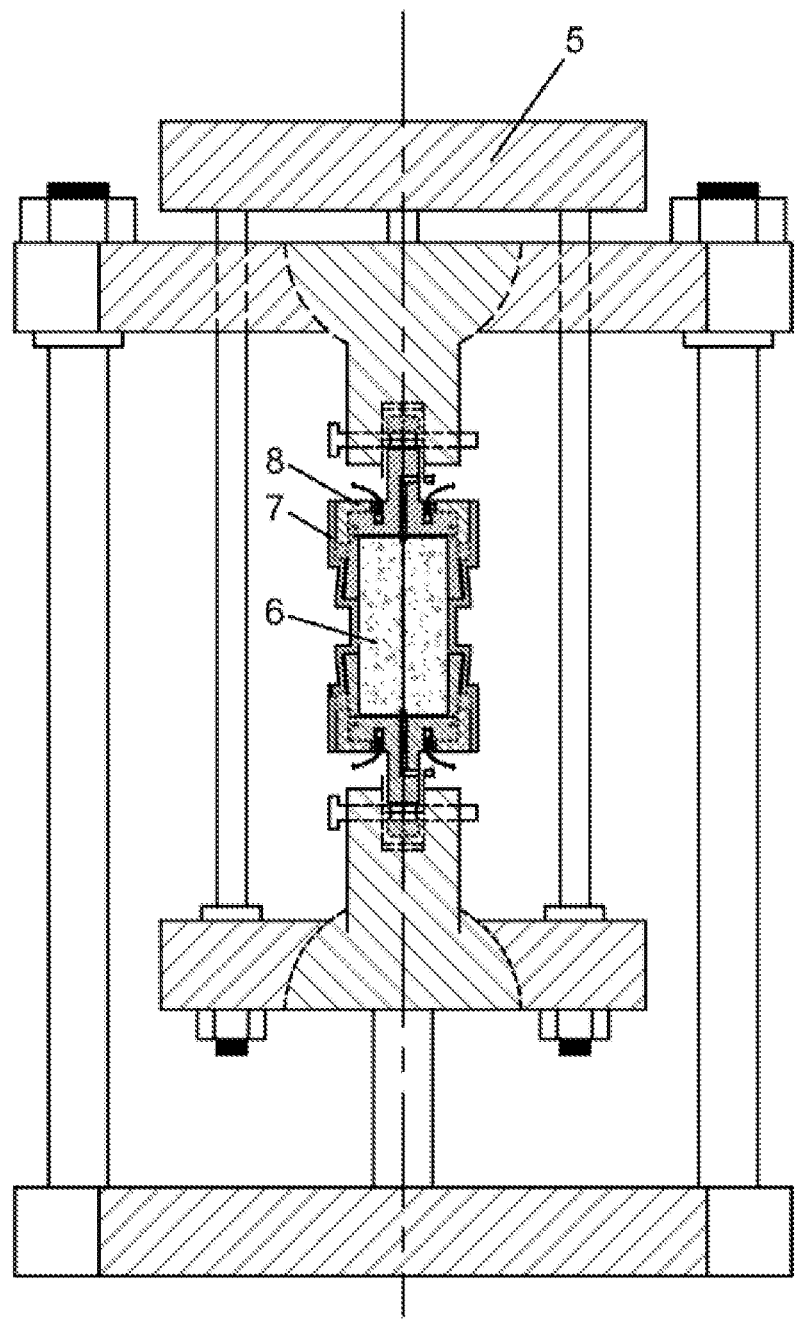
FIG. 4 is an installation schematic diagram of the clamping triaxial seepage and acoustic coupling rock tensile testing machine when a triaxial tensile test is carried out.
Figure 5:
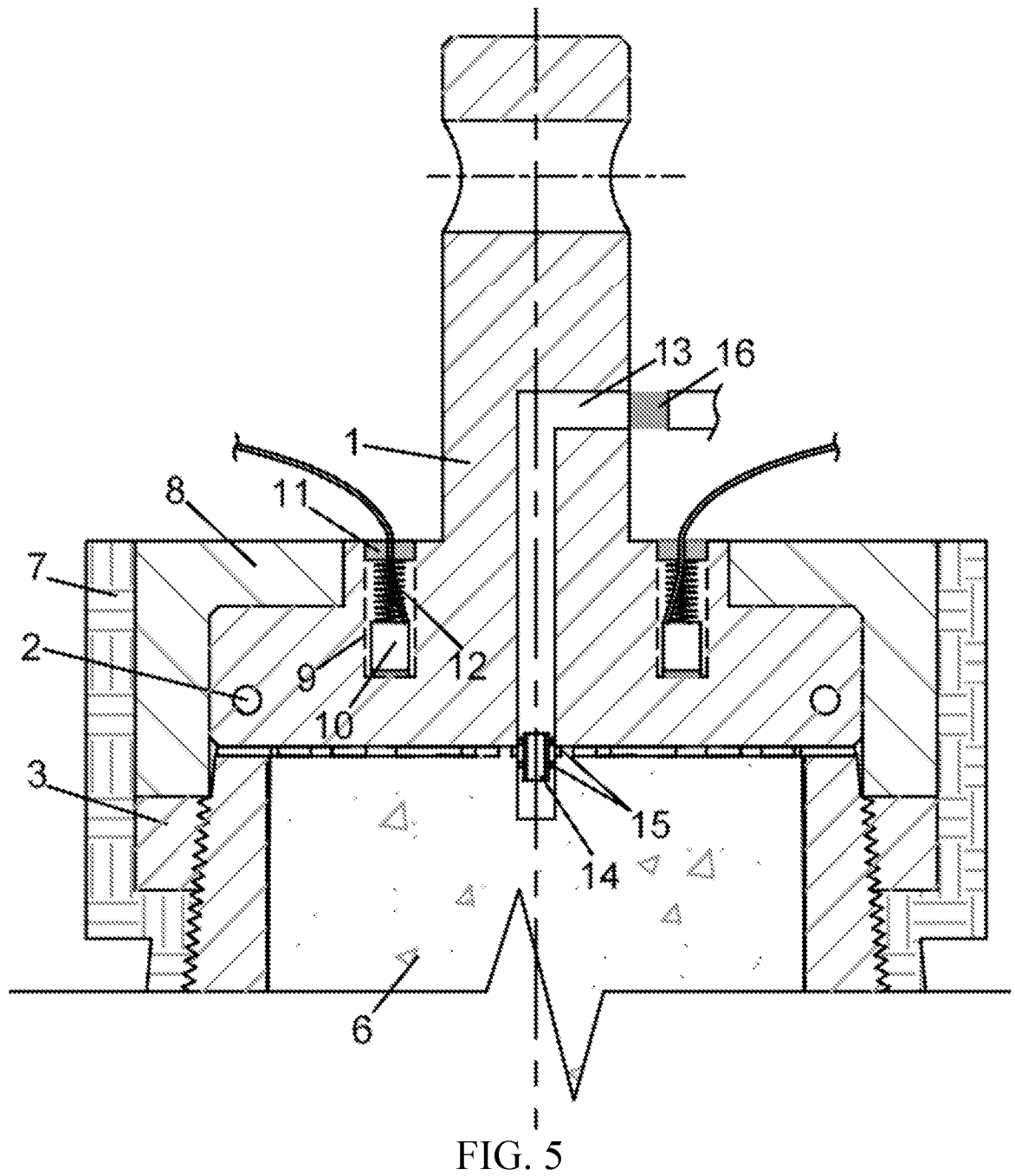
FIG. 5 is a front sectional schematic diagram of the upper chuck when the test is carried out.
Figure 6:
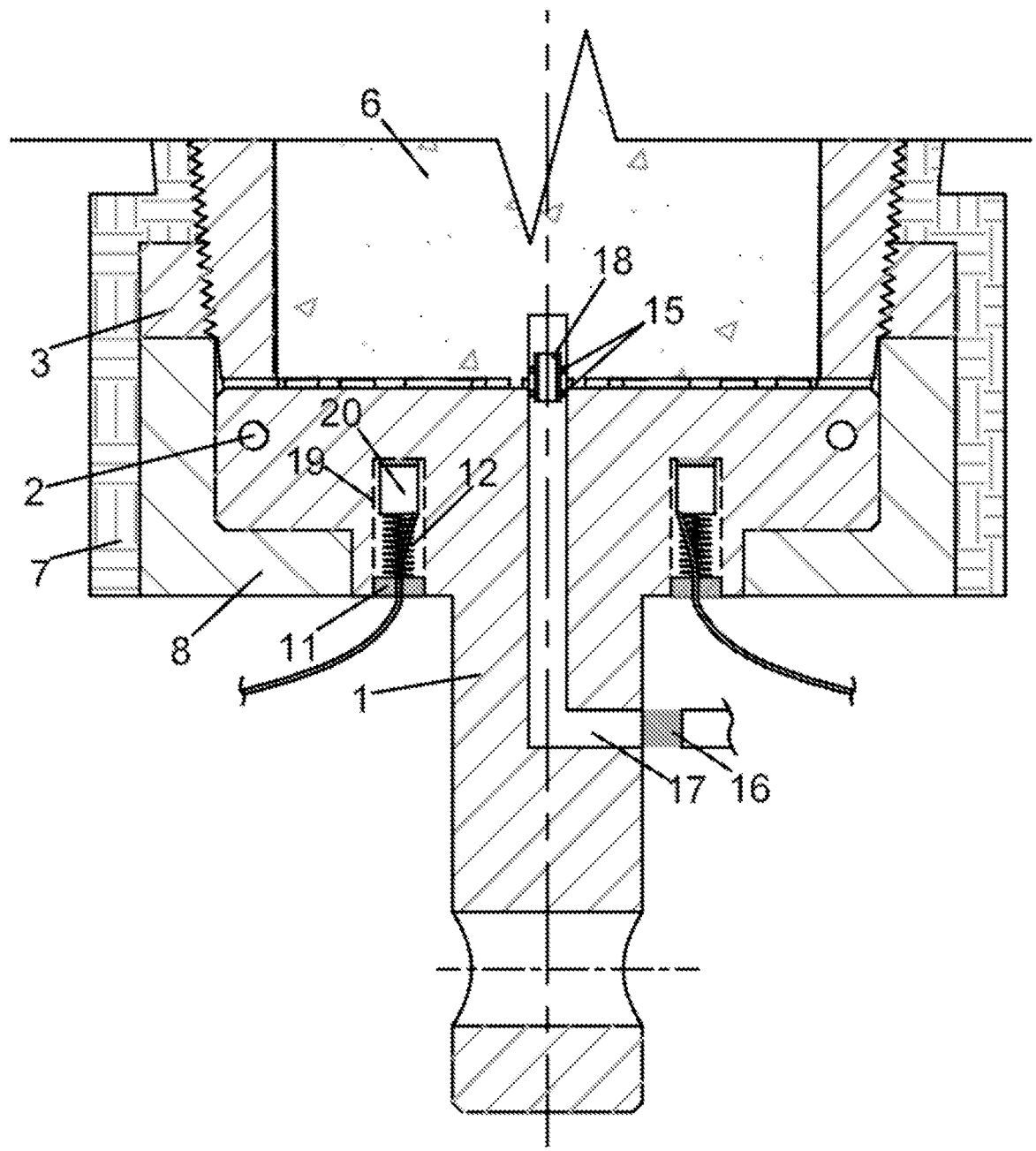
FIG. 6 is a front sectional schematic diagram of a lower chuck when the test is carried out.

The present invention is further described with reference to the accompanying drawings and embodiments.

As shown in FIG. 1 to FIG. 10, a clamping triaxial seepage and acoustic coupling rock tensile testing machine of the present invention comprises a sample 6 and a scaffold-type tensile testing device 5. The scaffold-type tensile testing device 5 is provided with an upper chuck 101 and a lower chuck 102. The clamping teeth 4 of the upper chuck 101 clamp an upper end of the sample 6. The clamping teeth 4 of the lower chuck 102 clamp a lower end of the sample 6.

The scaffold-type tensile testing device 5 is as shown in FIG. 1 and comprises a support frame. A top plate 503 is fixed on a top of the support frame, a bearing plate 505 is provided above the top plate 503, the bearing plate 505 is provided with a plurality of vertical force transferring rods 506, the force transferring rods 506 vertically penetrate through the top plate 503 and sliding fit with the top plate 503, lower ends of the force transferring rods 506 are provided with a tensile base 507, the lower chuck 102 is installed on a top of the tensile base 507, and the upper chuck 101 is installed on a bottom of the top plate 503.

The support frame is used to support other parts, and can adopt various structural frames. Preferably, the support frame comprises a base 501 and a plurality of vertical columns 502 arranged on the base 501, and the top plate 503 is fixed on upper parts of the columns 502 through first fixing nuts 504. The base 501 adopts a metal plate of a certain thickness, and the columns 502 may adopt cylindrical metal rods, which may be hollow tubes. Lower ends of the columns 502 can be welded with the base 501, or a common connection method such as threaded fit can be used, or support steps can be arranged on outer walls of the bottoms of the columns 502 and then placed on the base 501. Upper parts of the columns 502 are provided with external threads, which can be positioned by setting the first fixing nuts 504 on upper and lower surfaces of the top plate 503. Alternatively, the support steps can be arranged on the outer walls of the upper parts of the columns 502, the top plate 503 is placed on the support steps, and the first fixing nuts 504 are arranged on an upper surface of the top plate 503 to lock the top plate 503. The top plate 503 can be disassembled and installed, and the top plate 503 can be removed when being moved, which also facilitates adjustment of a height of the top plate 503.

The base 501 and top plate 503 can be a square, circular, triangle and other shapes, preferably the triangle with rounded angles. The number of columns 502 can be 3, 4, etc., preferably 3, which can position the top plate 503 more stably and fix it better. A smaller number of columns 502 are used, and space between the columns 502 is larger, which reserves operational space so that it is convenient to install other measurement sensors on the rock sample to be tested.

The bearing plate 505 is directly subjected to a compression load. The bearing plate 505, the force transferring rods 506 and the tensile base 507 constitute a tensile frame which converts the compression load into a tensile load. Upper ends of the force transferring rods 506 can be welded with the bearing plate 505, or can be connected by threaded connections, screw connection or positioning latch connections. The bearing plate 505 and the tensile base 507 can be a triangular, rectangular and other shapes, preferably a circular, and there are 3 force transferring rods 506, which can realize stable load transfer and prevent a tilt of the tensile frame. Lower ends of the force transferring rods 506 are provided with external threads, and the tensile base 507 is fixed to the lower ends of the force transferring rods 506 through second fixing nuts 508 for easy disassembly.

The bearing plate 505 is located above the top plate 503, and a spacing between the bearing plate 505 and the top plate 503 is appropriate to ensure that the compression load of the bearing plate 505 can be transferred to the force transferring rods 506. The force transferring rods 506 and the top plate 503 are sliding fitted, and fit clearance is as small as possible to ensure that the compression load is transferred vertically downward along the force transferring rods 506.

The tensile base 507 is provided with a lower ball head 509 sliding fitted with the tensile base 507, and the lower chuck 102 is installed on the lower ball head 509; and the top plate 503 is provided with an upper ball head 515 sliding fitted with the top plate 503, and the upper chuck 101 is installed on the upper ball head 515.

The lower ball head 509 and the upper ball head 515 are both provided with a hemispherical curved surface, while the top plate 503 is provided with a groove matched with the curved surface of the upper ball head 515, the tensile base 507 is provided with a groove matched with the curved surface of the lower ball head 509, so that the lower ball head 509 and the upper ball head 515 can be flexibly rotated within a certain angle range. After the processing of the sample 6, it is impossible to completely ensure that the two end faces are perpendicular to an axis of the sample 6. The lower chuck 102 and the upper chuck 101 after the sample 6 is clamped and fixed would cause that an axis of the tensile load cannot completely coincide with the axis of the sample 6. If there is a certain included angle, it would lead to an eccentric load and affect test results. After setting the lower ball head 509 and the upper ball head 515, if the axis of the tensile load deviates from the axis of the sample 6 during the test, the lower ball head 509 and the upper ball head 515 can automatically rotate under the action of the load, so that a load direction is consistent with an axial direction of the sample 6, so as to ensure the accuracy of the test results.

The lower chunk 102 is installed on the lower ball head 509 through a lower latch 510, and the upper chunk 101 is installed on the upper ball head 515 through an upper latch 514. A latch connection can be easily and quickly disassembled. In the test, the upper latch 514 and the lower latch 510 can be pulled out first, the lower chuck 102 and the upper chuck 101 are removed. After the two ends of the sample 6 are fixed to the lower chuck 102 and the upper chuck 101 respectively, the lower chuck 102 and the upper chuck 101 are then connected to the lower ball head 509 and the upper ball head 515 respectively through the latches. In this way, the installation of sample 6 is more convenient, which can ensure that the installation of sample 6 is stable and firm, and the installation position is in a high precision to ensure accuracy of measurement. In addition, the lower chunk 102 and the upper chunk 101 for fixing the samples 6 of different shapes and sizes can be replaced, so that the device can be used for tensile tests on the samples 6 of various shapes and sizes.

The scaffold-type tensile testing device 5 of the present invention converts the compression load into the tensile load through the tensile frame consisted of the bearing plate 505, a force transferring rods 506 and the tensile base 507, and the load applied to the sample 6 is equivalent to the load in an existing direct tensile test, which can ensure a failure occurs along a part with the lowest bearing force of the sample 6 and overcome the low accuracy of the traditional indirect tensile method.

In addition, the scaffold-type tensile testing device 5 has a simple structure, a low cost, a compact structure and a small volume, and can be put into a conventional triaxial testing machine for a seepage test. The triaxial testing machine comprises a pressure chamber 21, and a top of the pressure chamber 21 is provided with a pressure head.

As shown in FIG. 2, FIG. 3, FIG. 5 and FIG. 6, the upper chuck 101 and the lower chuck 102 both comprise a connecting column 1 and a plurality of clamping teeth 4; one end of each connecting column 1 is installed on the scaffold-type tensile testing device 5; the clamping teeth 4 are hinged with the other end of the connecting column 1; the plurality of clamping teeth 4 are enclosed into a clamping cavity; an outer wall of each clamping tooth 4 is in a circular arc shape and is provided with an external thread; the outer wall of each clamping tooth 4 is provided with a screwing ring 3 matching with the external thread; and a diameter of the outer wall of each clamping tooth 4 gradually decreases in a direction toward the connecting column 1.

An upper end of each connecting column 1 is installed through the lower latch 510 or the upper latch 514, and a lower end thereof is provided with a disk. The clamping teeth 4 may be 6, 8, 10 or 12, etc., which are uniformly distributed around a center line of each connecting column 1. An outer wall of the disk of each connecting column 1 is provided with a plurality of pairs of mounting bosses, and an end of each clamping tooth 4 is hinged between each pair of the mounting bosses through the positioning latch 2, so that the clamping tooth 4 can be rotated around the positioning latch 2. The screwing ring 3 is threaded with the clamping teeth 4. When the screwing ring 3 is rotated, the screwing ring 3 moves axially relative to the clamping teeth 4. Since a diameter of the outer wall of each clamping tooth 4 gradually decreases along a direction of the connecting column 1, that is, the outer wall of each clamping tooth 4 has a certain inclination, and when the screwing ring 3 moves away is from the connecting column 1, the clamping tooth 4 is pushed to rotate inward. Thus, the sample 6 inserting into a clamping cavity can be clamped.

The sample 6 can be a circular sample or a square sample. When the sample 6 is a circular sample, the shape of the clamping cavity is a circular. When the sample 6 is a square sample, the shape of the clamping cavity is a square.

Figure 7:
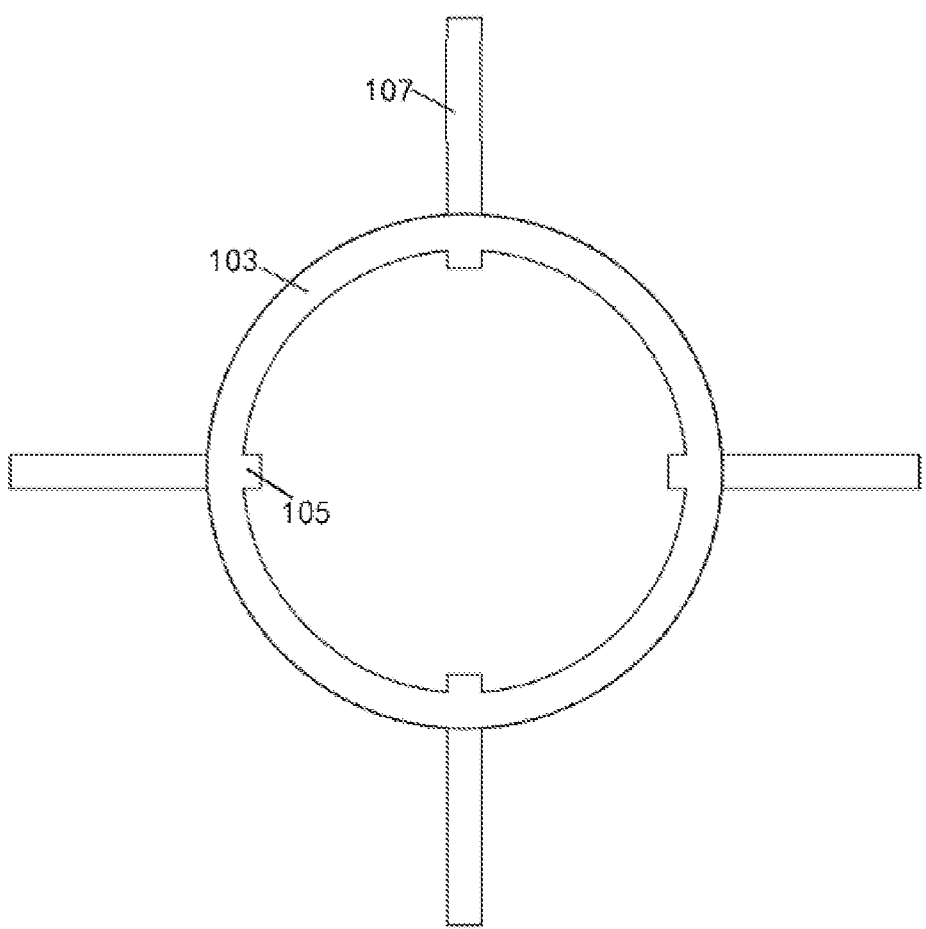
FIG. 7 is a top schematic diagram of a first screwing turntable.
Figure 8:
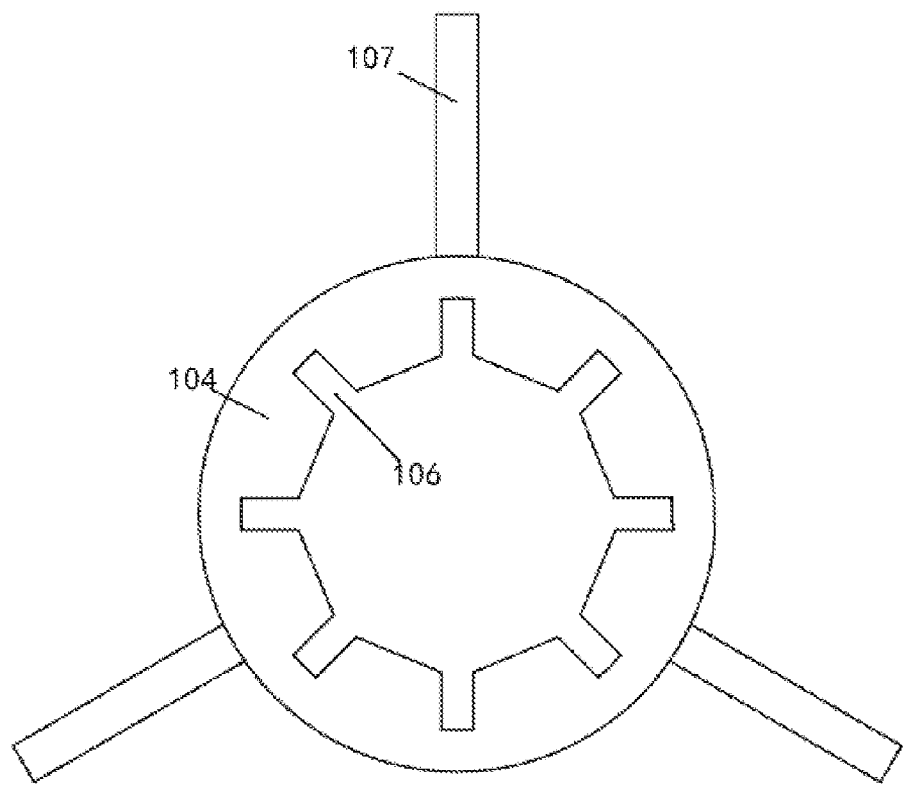
FIG. 8 is a top schematic diagram of a second screwing turntable.

In order to rotate the screwing ring 3 more effortlessly, the present invention further comprises a first screwing turntable 103 and a second screwing turntable 104. As shown in FIG. 7, an inner wall of the first screwing turntable 103 is provided with a plurality of bosses 105, an outer wall of the screwing ring 3 is provided with a plurality of clamping slots, the first screwing turntable 103 is sleeved outside the screwing ring 3, and each of the bosses 105 is stuck into a clamping slot. As shown in FIG. 8, an inner wall of the second screwing turntable 104 is provided with a plurality of positioning slots 106, an outer wall of the connecting column 1 is provided with a plurality of transmission bulges, the second screwing turntable 104 is sleeved outside the clamping teeth 4, and each of the transmission bulges is clamped into a positioning slot 106.

When clamping, an end of the sample 6 to is inserted to a bottom of the clamping cavity, the first screwing turntable 103 is sleeved outside the screwing ring 3, and the convex table 105 is stuck into the outer wall of the screwing ring 3, the second screwing turntable 104 is sleeved on the plurality of pairs of mounting bosses set on the outer wall of the disk of the connecting column 1, and is stuck into the positioning slots 106. By simultaneously rotating the first screwing turntable 103 and the second screwing turntable 104, and rotating the first screwing turntable 103 and the second screwing turntable 104 in opposite directions, the screwing ring 3 can be rotated relative to the clamping teeth 4, thus pushing the clamping teeth 4 to clamp the sample 6. In order to improve the effect of saving effort, the first screwing turntable 103 and the second screwing turntable 104 are both provided with a screwing handle 107.

In order to realize acoustic detection and rock tensile test under the action of seepage, an acoustic component and a seepage component are arranged in the connection columns 1 of the upper chuck 101 and the lower chuck 102. Specifically, an acoustic transmitting channel 9 is arranged in the upper chuck 101, one end of the acoustic transmitting channel 9 is communicated with the outside, and the other end is provided with an acoustic transmitting probe 10. The acoustic transmitting probe can emit acoustic, and a transmitting direction of the acoustic transmitting probe 10 is downward.

The lower chuck 102 is provided with an acoustic receiving channel 19; one end of the acoustic receiving channel 19 is communicated with the outside; the other end is provided with an acoustic receiving probe 20; and the acoustic receiving probe 20 receives an acoustic wave transmitted by the acoustic transmitting probe 10. The number of acoustic transmitting probe 10 and the acoustic receiving probe 20 are all three and they correspond one by one. The acoustic transmitting probe 10 and the acoustic receiving probe 20 are uniformly arranged around a center of the clamping cavity.

The acoustic transmitting channel 9 and the acoustic receiving channel 19 are vertically arranged blind holes, the acoustic transmitting probe 10 and the acoustic receiving probe 20 are located at bottoms of the blind holes, the openings of the blind holes are provided with threaded caps 11, the threaded caps 11 fit with sidewall threads of the blind holes, and the threaded caps 11 are provided with springs 12 inside. The springs 12 are in a compressed state. An elastic force of each spring 12 is used to press the acoustic transmitting probe 10 and the acoustic receiving probe 20 to keep the acoustic transmitting probe 10 and the acoustic receiving probe 20 stable.

An upper end face of the sample 6 is provided with a seepage outflow hole; the upper chuck 101 is provided with a seepage outflow channel 13; one end of the seepage outflow channel 13 is connected with the seepage outflow hole, and the other end is communicated with the outside; a lower end face of the sample 6 is provided with a seepage inflow hole; the lower chuck 102 is provided with a seepage entry channel 17; and one end of the seepage entry channel 17 is connected with the seepage inflow hole, and the other end is communicated with the outside.

During the test, seepage medium can be passed into the seepage inflow hole through the seepage entry channel 17 to generate the seepage, and the seepage outflow channel 13 is used to discharge the seepage medium. The seepage entry channel 17 and the seepage outflow channel 13 are both communicated with the outside through a seepage joint 16. During the test, an external seepage outflow tube 24 or seepage inflow tube 25 can be connected through the seepage joint 16.

In order to improve sealing of the seepage outflow channel 13 and the seepage entry channel 17, the seepage outflow channel 13 is connected with the seepage outflow hole through an upper spile 14, the seepage entry channel 17 is connected with the seepage inflow hole through a lower spile 18, and outer walls of the upper spile 14 and the lower spile 18 are both provided with a sealing ring 15. The number of the sealing rings 15 may be multiple to ensure the sealing effect.

Figure 9:
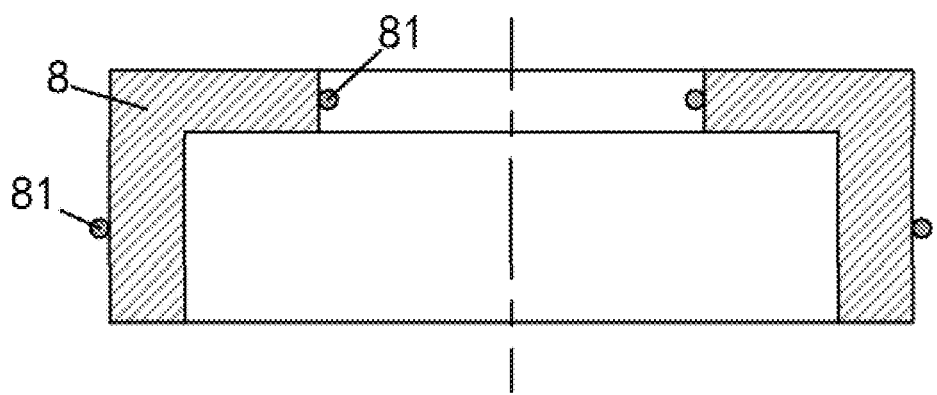
FIG. 9 is a sectional schematic diagram of a sealing sleeve.

When conducting the tensile test under triaxial lateral stress, it is necessary to set an oil pressure protective film 7 on the outer walls of sample 6 and the clamping teeth 4, and the whole scaffold-type tensile testing device 5 is placed in an confining pressure liquid with a certain pressure, and a lateral pressure is applied to the sample 6 by using the confining pressure liquid. Due to a gap between two adjacent clamping teeth 4, in order to prevent the oil pressure protective film 7 from being pressed into the gap and then the oil pressure protective film 7 is damaged, which leads to the confining pressure liquid entering the sample 6, a spacing between the two adjacent clamping teeth 4 is filled with a rubber block, an outer wall of one end of the connecting column 1 connected with the clamping teeth 4 is provided with a sealing sleeve 8, and an inner wall and outer wall of the sealing sleeve 8 are both provided with a sealing ring 81. The sealing sleeve 8 is a metal cylinder. As shown in FIG. 9, the sealing ring 81 arranged inside it can improve the sealing effect and prevent the confining pressure liquid from entering the sample 6 from the ends of the clamping teeth 4. The rubber block itself has the sealing effect, which can seal the spacing between the adjacent two clamping teeth 4, and support the oil pressure protective film 7 to prevent the oil pressure protective film 7 from being damaged.

The present invention adopts the conventional triaxial testing machine to carry out the triaxial seepage and acoustic coupling rock tensile test. A specific test method is as follows: the upper end of the sample 6 is inserted among the plurality of the clamping teeth 4 of the upper chuck 101, and the lower end of the sample 6 is inserted among the plurality of the clamping teeth 4 of the lower chuck 102. The rubber block is filled into the spacing between two adjacent clamping teeth 4, and then the screwing ring 3 is rotated, which drives the plurality of the clamping teeth 4 to rotate inward so as to clamp the two ends of the sample 6, and the sample 6 remains being fixed, and then the sealing sleeve 8 is installed.

Figure 10:
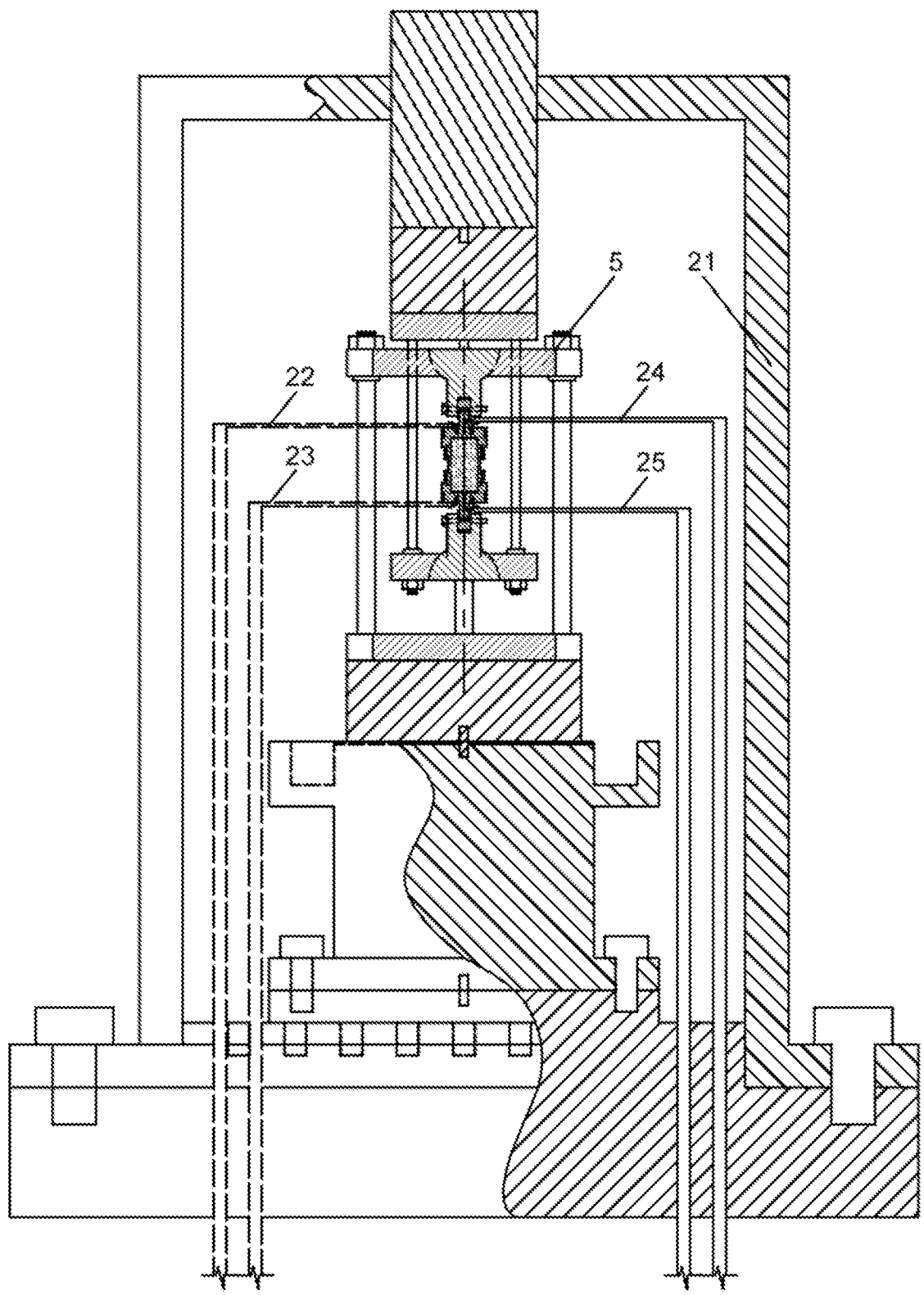
FIG. 10 is a schematic diagram of a clamping triaxial seepage and acoustic coupling rock tensile testing machine when the test is carried out in the present invention.

Then, the oil pressure protection heat shrink film 7 is fixed on the outer walls of the sample 6 and the clamping teeth 4 and the outer wall of the sealing sleeve 8, and then the whole scaffold-type tensile testing device 5 is placed in the pressure chamber 21 of the triaxial testing machine, and the seepage outflow channel 13 is connected with the seepage outflow tube 24, the seepage entry channel 17 is connected with the seepage inflow tube 25, and the seepage medium with a certain pressure is inputted through the seepage inflow tube 25 so as to produce the seepage. The acoustic transmitting probe 10 is connected to an acoustic transmitting wire 22, the acoustic receiving probe 20 is connected to the acoustic receiving wire 23, and the acoustic transmitting wire 22 and the acoustic receiving wire 23 are connected to an external acoustic control system, and the acoustic detection is carried out on the sample 6, as shown in FIG. 10.

The pressure chamber 21 is filled with oil to apply the triaxial lateral compression stress, and the compression load is applied to the bearing plate 505 through an indenter of the testing machine. The compression load is transferred to the tensile base 507 through the force transferring rods 506, and the tensile base 507 forms a tensile load on the sample 6, and the size of the tensile load is equal to a compression load applied by a material compression mechanics testing machine. When the sample 6 is destroyed, the oil in the pressure chamber 21 is pumped back, the seepage outflow tube 24, the seepage inflow tube 25, the acoustic transmitting wire 22 and the acoustic receiving wire 23 are removed, and the sample 6 is taken out.

The above are preferred embodiments of the present invention only and are not intended to limit the present invention. For a person skilled in the art, the present invention is subject to various changes and variations. Any modifications, equivalent substitutions, improvements, and the like within the spirit and principles of the invention are intended to be included within the scope of the present invention.

The invention claimed is:

1. A clamping triaxial seepage and acoustic coupling rock tensile testing machine, wherein the machine comprises a sample (6) and a scaffold-type tensile testing device (5); the scaffold-type tensile testing device (5) is provided with an upper chuck (101) and a lower chuck (102); the upper chuck (101) and the lower chuck (102) both comprise a connecting column (1) and a plurality of clamping teeth (4); one end of each connecting column (1) is installed on the scaffold-type tensile testing device (5); the clamping teeth (4) are hinged with the other end of the connecting column (1); the plurality of clamping teeth (4) are enclosed into a clamping cavity; an outer wall of each clamping tooth (4) is in a circular arc shape and is provided with an external thread; the outer wall of each clamping tooth (4) is provided with a screwing ring (3) matching with the external thread; and a diameter of the outer wall of each clamping tooth (4) gradually decreases in a direction toward the connecting column (1);

the upper chuck (101) is provided with an acoustic transmitting channel (9); one end of the acoustic transmitting channel (9) is communicated with the outside; the other end is provided with an acoustic transmitting probe (10); and a transmitting direction of the acoustic transmitting probe (10) is downward;

the lower chuck (102) is provided with an acoustic receiving channel (19); one end of the acoustic receiving channel (19) is communicated with the outside; the other end is provided with an acoustic receiving probe (20); the acoustic receiving probe (20) receives an acoustic wave transmitted by the acoustic transmitting probe (10);

the clamping teeth (4) of the upper chuck (101) clamp an upper end of the sample (6); the clamping teeth (4) of the lower chuck (102) clamp a lower end of the sample (6); an upper end face of the sample (6) is provided with a seepage outflow hole; the upper chuck (101) is provided with a seepage outflow channel (13); one end of the seepage outflow channel (13) is connected with the seepage outflow hole, and the other end is communicated with the outside; a lower end face of the sample (6) is provided with a seepage inflow hole; the lower chuck (102) is provided with a seepage entry channel (17); and one end of the seepage entry channel (17) is connected with the seepage inflow hole, and the other end is communicated with the outside.

2. The clamping triaxial seepage and acoustic coupling rock tensile testing machine according to claim 1, wherein a spacing between two adjacent clamping teeth (4) is filled with a rubber block; an outer wall of one end of the connecting column (1) connected with the clamping teeth (4) is provided with a sealing sleeve (8); and an inner wall and an outer wall of the sealing sleeve (8) are both provided with a sealing ring (81).

3. The clamping triaxial seepage and acoustic coupling rock tensile testing machine according to claim 1, wherein the machine further comprises a first screwing turntable (103) and a second screwing turntable (104), an inner wall of the first screwing turntable (103) is provided with a plurality of bosses (105), an outer wall of the screwing ring (3) is provided with a plurality of clamping slots, the first screwing turntable (103) is sleeved outside the screwing ring (3), and each of the bosses (105) is stuck into a clamping slot; an inner wall of the second screwing turntable (104) is provided with a plurality of positioning slots (106), an outer wall of the connecting column (1) is provided with a plurality of transmission bulges, the second screwing turntable (104) is sleeved outside the clamping teeth (4), and each of the transmission bulges is stuck into a positioning slot (106).

4. The clamping triaxial seepage and acoustic coupling rock tensile testing machine according to claim 3, wherein the first screwing turntable (103) and the second screwing turntable (104) are both provided with a screwing handle (107).

5. The clamping triaxial seepage and acoustic coupling rock tensile testing machine according to claim 1, wherein the seepage entry channel (17) and the seepage outflow channel (13) are both communicated with the outside through a seepage joint (16).

6. The clamping triaxial seepage and acoustic coupling rock tensile testing machine according to claim 1, wherein the acoustic transmitting channel (9) and the acoustic receiving channel (19) are vertically arranged blind holes, the acoustic transmitting probe (10) and the acoustic receiving probe (20) are located at bottoms of the blind holes, the openings of the blind holes are provided with threaded caps (11), and the threaded caps (11) are provided with springs (12) inside.

7. The clamping triaxial seepage and acoustic coupling rock tensile testing machine according to claim 1, wherein the seepage outflow channel (13) is connected with the seepage outflow hole through an upper spile (14), the seepage entry channel (17) is connected with the seepage inflow hole through a lower spile (18), and outer walls of the upper spile (14) and the lower spile (18) are both provided with a sealing ring (15).

8. The clamping triaxial seepage and acoustic coupling rock tensile testing machine according to claim 1, wherein a top plate (503) is fixed on a top of the scaffold-type tensile testing device (5), a bearing plate (505) is provided above the top plate (503), the bearing plate (505) is provided with a plurality of vertical force transferring rods (506), the force transferring rods (506) vertically penetrate through the top plate (503) and sliding fit with the top plate (503), lower ends of the force transferring rods (506) are provided with a tensile base (507), the lower chuck (102) is installed on a top of the tensile base (507), and the upper chuck (101) is installed on a bottom of the top plate (503).

9. The clamping triaxial seepage and acoustic coupling rock tensile testing machine according to claim 8, wherein the tensile base (507) is provided with a lower ball head (509) sliding fitted with the tensile base (507), and the lower chuck (102) is installed on the lower ball head (509); and the top plate (503) is provided with an upper ball head (515) sliding fitted with the top plate (503), and the upper chuck (101) is installed on the upper ball head (515).

10. The clamping triaxial seepage and acoustic coupling rock tensile testing machine according to claim 1, wherein the upper end of the sample (6) is extended among the plurality of clamping teeth (4) of the upper chuck (101), the lower end of the sample (6) is extended among the plurality of clamping teeth (4) of the lower chuck (102), and a rubber block is filled to a spacing between two adjacent clamping teeth (4), and then the screwing ring (3) is rotated, and the screwing ring (3) drives the plurality of clamping teeth (4) to rotate inward to clamp both ends of the sample (6) and the sealing sleeve (8) is installed; then, an oil pressure protection heat shrink film (7) is fixed on the outer wall of the sample (6) and the clamping teeth (4), and then the whole scaffold-type tensile testing device (5) is placed in a pressure chamber (21), the seepage outflow channel (13) is connected with a seepage outflow tube (24), the seepage entry channel (17) is connected with a seepage inflow tube (25), and a seepage medium with a certain pressure is passed through the seepage inflow tube (25) to produce seepage; the acoustic transmitting probe (10) is connected to an acoustic transmitting wire (22), the acoustic receiving probe (20) is connected to an acoustic receiving wire (23), the acoustic transmitting wire (22) and the acoustic receiving wire (23) are connected to an external acoustic control system, and an acoustic detection is carried out on the sample (6); the pressure chamber (21) is filled with oil to apply a triaxial lateral compression stress, a compression load is applied to the bearing plate (505) through an indenter of the testing machine, the compression load is transmitted through the force transferring rods (506) to the tensile base (507), and the tensile base (507) forms a tensile load on the sample (6), wherein the tensile load is equal to a compression load applied by a material compression mechanics testing machine; and when the sample (6) is destroyed, the oil in the pressure chamber (21) is pumped back, and the seepage outflow tube (24), the seepage inflow tube (25), the acoustic transmitting wire (22) and the acoustic receiving wire (23) are removed.

\* \* \* \* \*